(12) United States Patent
Usuda et al.

(10) Patent No.: US 8,061,939 B2
(45) Date of Patent: Nov. 22, 2011

(54) ATTACHMENT UNIT FOR FIVE-FACE MACHINING

(75) Inventors: Satoi Usuda, Inabe (JP); Daisuke Ito, Kuwana (JP); Satoshi Yoshinobu, Aichi-pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 0 days.

(21) Appl. No.: 12/989,473

(22) PCT Filed: Sep. 10, 2009

(86) PCT No.: PCT/JP2009/065870
§ 371 (c)(1),
(2), (4) Date: Oct. 25, 2010

(87) PCT Pub. No.: WO2011/030432
PCT Pub. Date: Mar. 17, 2011

(65) Prior Publication Data
US 2011/0182686 A1    Jul. 28, 2011

(51) Int. Cl.
*B23C 1/12* (2006.01)
(52) U.S. Cl. .......... 409/144; 409/230
(58) Field of Classification Search ........... 409/144, 409/230, 201, 211, 215, 204; *B23C 1/00, B23C 1/12*
See application file for complete search history.

(56) References Cited

U.S. PATENT DOCUMENTS

| 3,757,637 | A | * | 9/1973 | Eich et al. | 409/230 |
| 3,930,301 | A | * | 1/1976 | Wagner | 483/32 |
| 4,614,470 | A | * | 9/1986 | Sato et al. | 409/230 |
| 4,709,465 | A | * | 12/1987 | Lewis et al. | 483/7 |
| 5,211,515 | A | * | 5/1993 | Hirabayashi | 409/230 |
| 7,882,608 | B2 | * | 2/2011 | Kume et al. | 29/407.01 |
| 2008/0199270 | A1 | * | 8/2008 | Yoshikawa et al. | 409/232 |

FOREIGN PATENT DOCUMENTS

| JP | 55090215 A | * | 7/1980 |
| JP | 60-14832 | | 1/1985 |
| JP | 63-744 | | 1/1988 |
| JP | 02-224941 | | 9/1990 |
| JP | 03-04339 | | 1/1991 |
| JP | 05-138411 | | 6/1993 |
| JP | 07-308839 | | 11/1995 |

OTHER PUBLICATIONS

International Search Report and Written Opinion for corresponding International Application No. PCT/JP2009/065870 mailed Nov. 10, 2009 (with English translation).

* cited by examiner

*Primary Examiner* — Daniel Howell
(74) *Attorney, Agent, or Firm* — Renner, Otto, Boisselle & Sklar, LLP

(57) ABSTRACT

The present invention provides an attachment to be attached to a spindle head of a vertical machining center for gripping an angle tool holder and performing five-face machining. An attachment unit 100 for five-face machining comprises a ring-shaped cylinder member 110 fixed to a lower portion of a spindle head, and a clamp unit 130 directly connected to a piston disposed in the interior of a cylinder member. The clamp unit 130 is equipped with four collet chucks 140 for gripping a pull stud bolt 270 disposed on an arm 250 of an angle tool holder 200 attached to a spindle and drives an angle tool 220.

4 Claims, 15 Drawing Sheets

(b)

(a)

(b)

(a)

(a)

(b)

(c)

(a)

(b)

(c)

ATTACHMENT UNIT FOR FIVE-FACE MACHINING

TECHNICAL FIELD

The present invention relates to an attachment unit for five-face machining disposed on vertical machining centers to enable five-face machining.

BACKGROUND ART

The following patent documents 1 and 2 disclose angle tool holders attached in a detachable manner to a spindle of a machine tool for rotating a tool around an axis line orthogonal to an axis line of the spindle.

CITED REFERENCES

Patent Documents

[Patent document 1] Japanese patent publication No. 03-4339
[Patent document 2] Japanese patent application laid-open publication No. 07-308839

SUMMARY OF THE INVENTION

Problem to be Solved by the Invention

The art disclosed in patent document 1 controls the rotation of an angle tool holder through use of a hydraulic piston. The art disclosed in patent document 2 provides a mechanism for driving a slide member disposed on the angle tool holder using the pressure of a high pressure coolant to disengage the slide member from the positioning blocks.

The clamp mechanisms disclosed in patent documents 1 and 2 have small rigidity and have limited ability to endure heavy machining using the angle tools.

The object of the present invention is to provide an attachment unit for five-face machining capable of being attached to a vertical machining center for realizing powerful five-face machining.

Means for Solving the Problem

In order to achieve the above-mentioned object, the attachment unit for five-face machining according to the present invention attached to a spindle head of a vertical machining center comprises a ring-shaped cylinder member fit to an outer circumference portion of a spindle housing projected from a lower end portion of a spindle head for supporting a spindle and secured to the spindle head, a clamp unit directly connected to a ring-shaped piston disposed within the ring-shaped cylinder member and moved up and down, and four collet chucks disposed at regular intervals along a circumference on a lower side of the clamp unit, wherein one of the four collet chucks grips a pull stud bolt disposed on an arm of an allocated angle tool holder attached to the spindle.

Further, the four collet chucks have claws that open and close via hydraulic pistons, wherein the claws are closed when the clamp unit is at an elevated position, and the claws are closed again after the clamp unit is lowered to grip the pull stud bolt on the angle tool holder. The four collet chucks are each equipped with a shutter device that opens and closes in interlinked manner with the operation of the clamp unit to prevent the entry of particles, and in addition, the inner pressure of the four collet chucks is increased via an air blow device.

EFFECT OF THE PRESENT INVENTION

By additionally attaching the attachment unit for five-face machining according to the present invention to a vertical machining center, the machining ability of the machining center can be enhanced easily by using the angle tool holder.

BEST MODE FOR CARRYING OUT THE INVENTION

Figure 1:
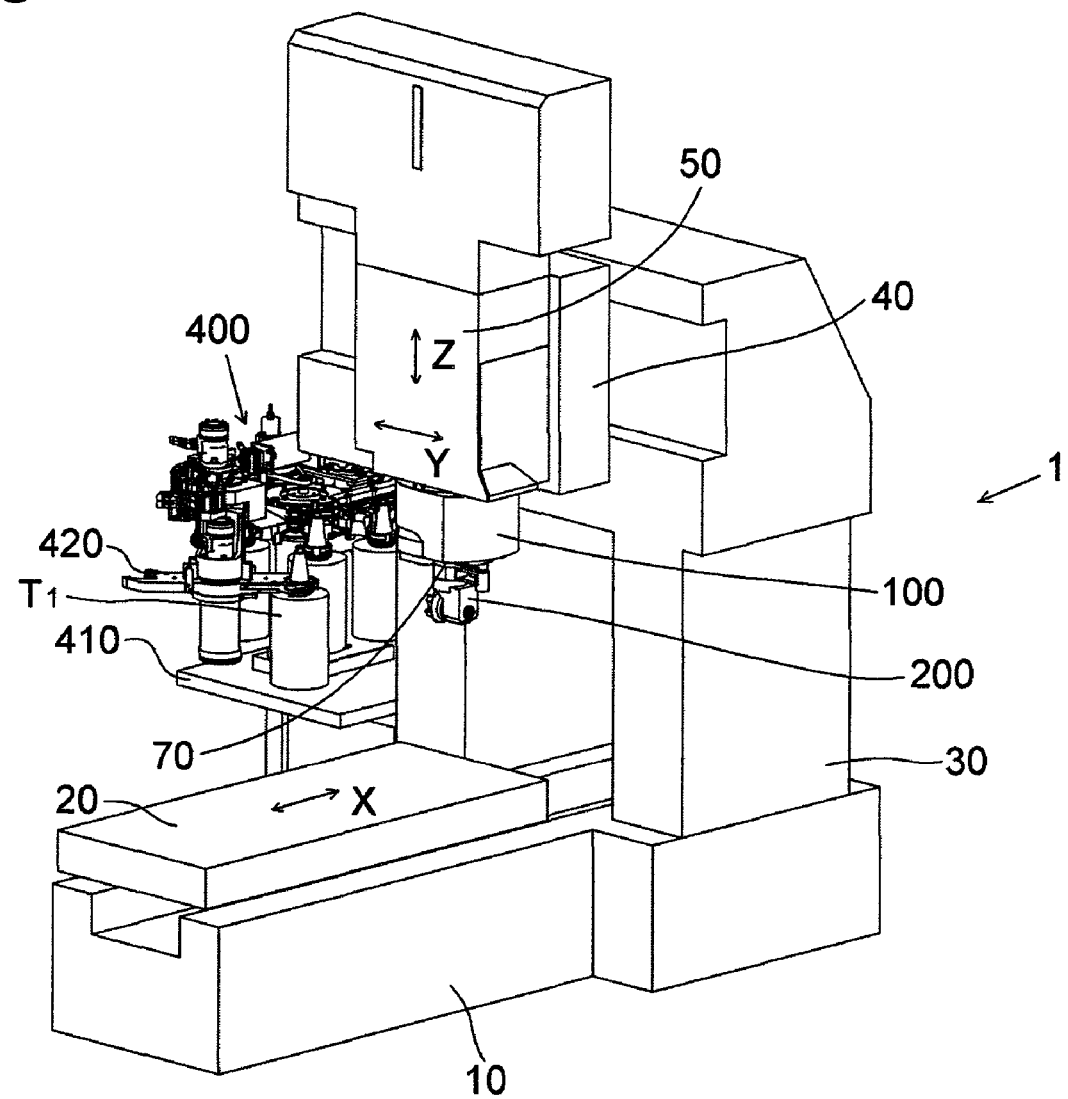
FIG. 1 is a mechanical configuration diagram of a vertical machining center.

FIG. 1 is a perspective view showing a mechanical configuration of a vertical machining center equipped with an attachment unit for five-face machining according to the present invention.

A vertical machining center denoted as a whole by reference number 1 has a table 20 that moves in the direction of axis X on a base 10.

A double column 30 is erected on the base 10, and a saddle 40 supported on a guide rail disposed on a front side of the double column 30 moves in the direction of axis Y.

A spindle head 50 equipped with a spindle 70 is attached to a front side of the saddle 40, and moves in the direction of axis Z.

A bracket 410 equipped with a tool magazine 400 is attached to the base 10. The tool magazine 400 stores various tools $T_1$, and an ATC arm 420 supplies necessary tools to the spindle 70 in an exchangeable manner.

An attachment unit 100 for five-face machining according to the present invention is fixed to an outer circumference of a cylindrical spindle housing that supports the spindle 70. An angle tool holder 200 is attached to the spindle head 50 via the attachment unit 100 for five-face machining.

Figure 2:
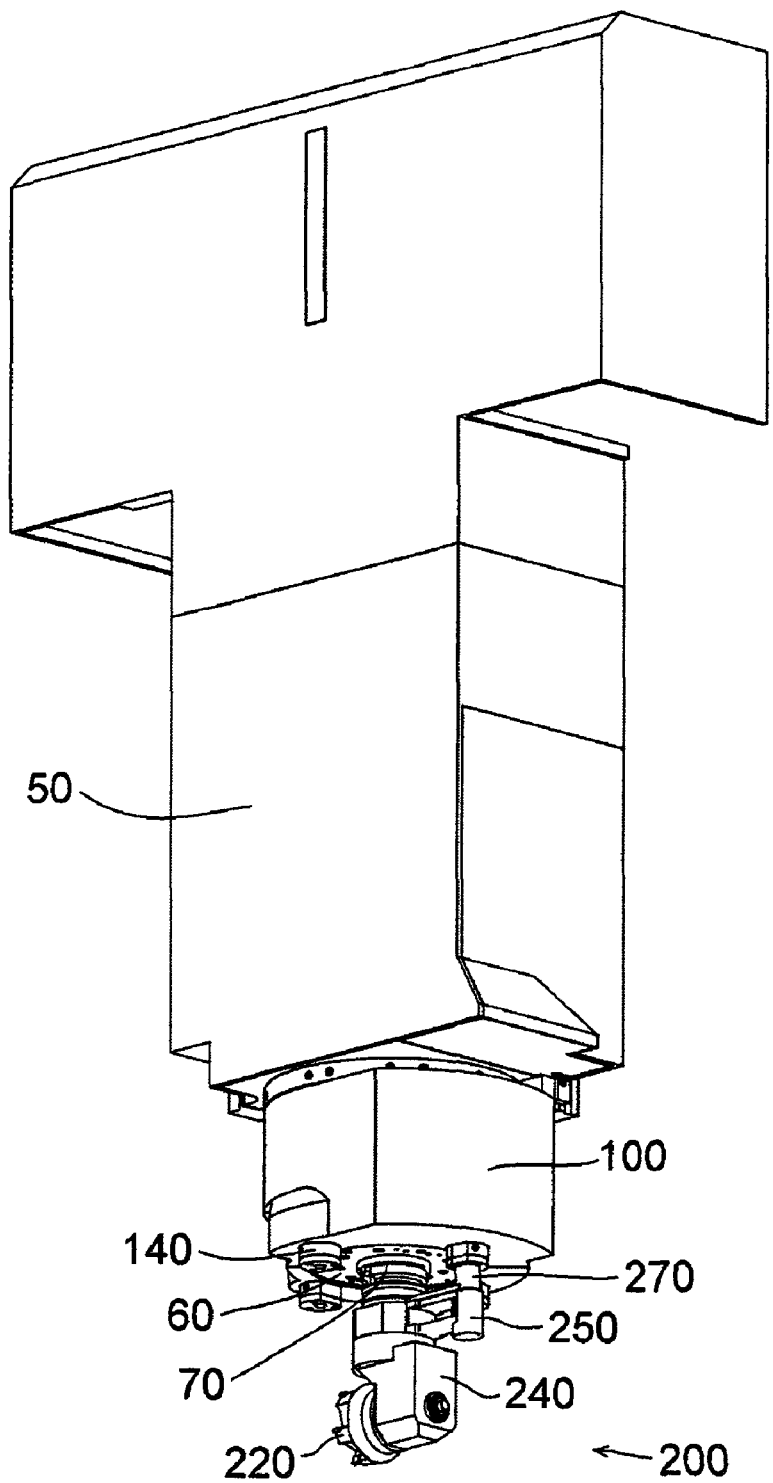
FIG. 2 is an explanatory view of a spindle head equipped with an attachment unit for five-face machining.
Figure 3:
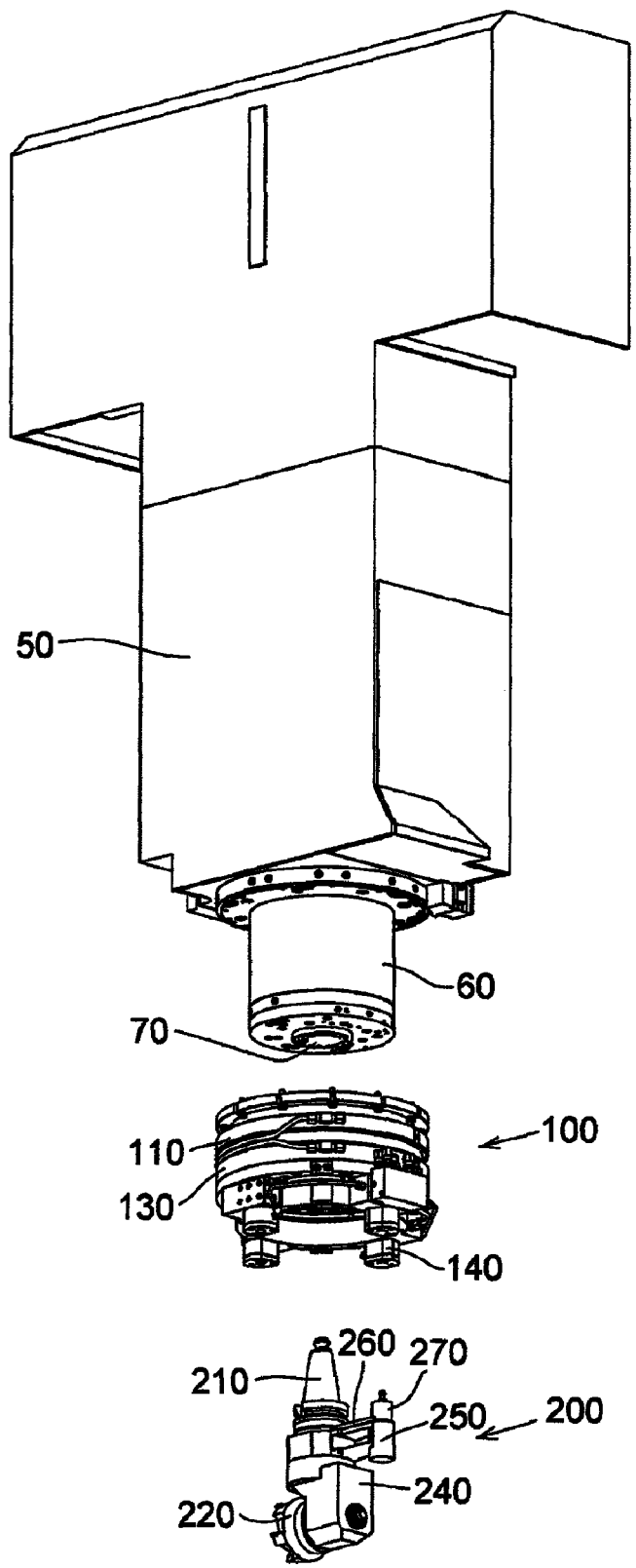
FIG. 3 is an explanatory view of the spindle head equipped with the attachment unit for five-face machining.
Figure 4:
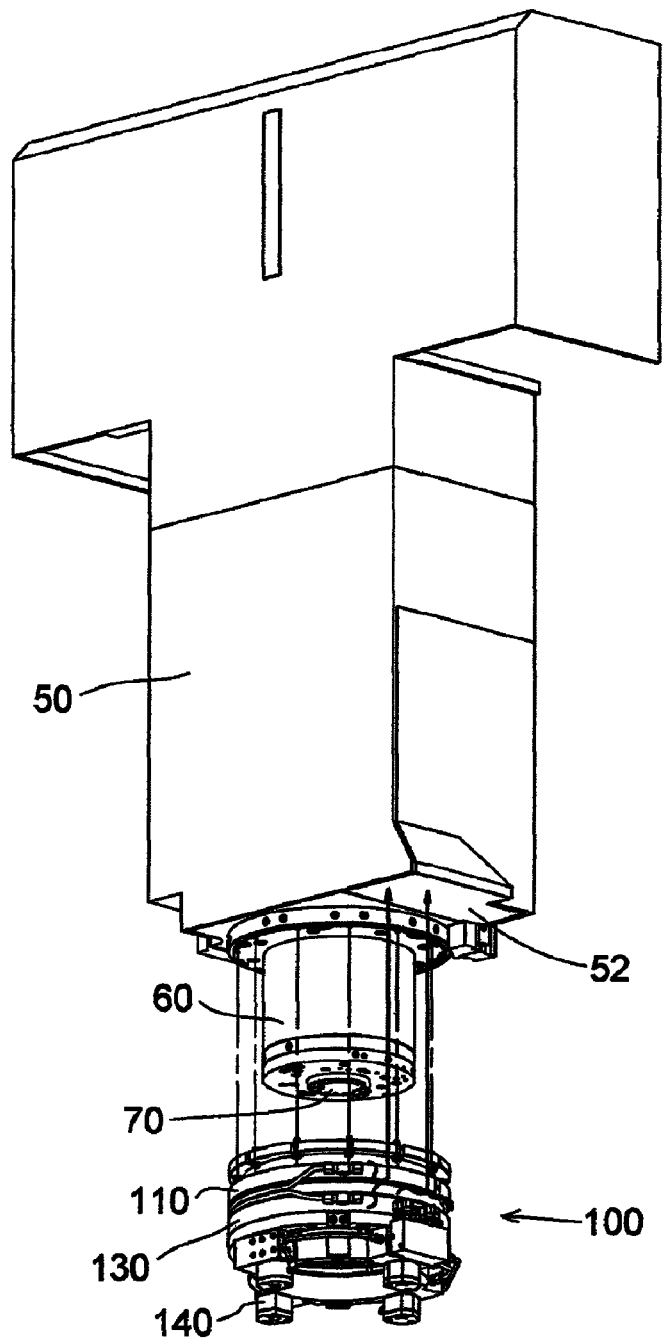
FIG. 4 is an explanatory view of the spindle head equipped with the attachment unit for five-face machining.
Figure 4:
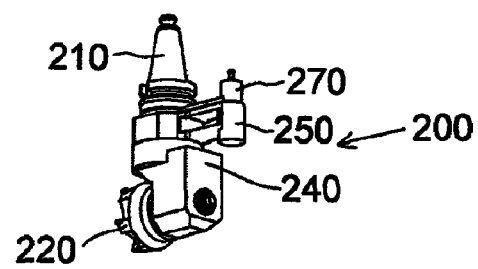

FIGS. 2, 3 and 4 are an assembly drawing and exploded views of the main components of the spindle head 50 equipped with the attachment unit 100 for five-face machining according to the present invention.

A cylindrical spindle housing 60 protruded from a lower end portion of the spindle head 50 supports the spindle 70 in a rotatable manner.

The attachment unit 100 for five-face machining has a bore portion inserted to an outer circumference portion of the spindle housing 60, wherein the upper portion of the attachment unit is attached via bolts or the like to a lower end portion 52 of the spindle head 50.

The attachment unit 100 for five-face machining has a ring-shaped cylinder member 110 fit to the spindle housing 60 and secured to the lower end of the spindle head 50, and a clamp unit 130 directly connected to and moved up and down by a ring-shaped piston 120 disposed in the ring-shaped cylinder member 110.

Four collet chucks 140 are disposed on a lower side of the clamp unit 130 along the circumference thereof.

The angle tool holder 200 is equipped with a shank 210 inserted to a tapered hole of the spindle 70, and an angle cutter 220 driven by the rotation of the shank 210. A power transmission mechanism, a shaft bearing and the like are disposed in a housing 240. An arm 250 is equipped with a pull stud bolt 270.

When the pull stud bolt 270 is clamped in the collet chuck 140 of the clamp unit 130 in the manner described later, the rotation of the angle tool holder 200 is controlled and cutting resistance is received. When the pull stud bolt 270 is unclamped, the arm 250 revolves together with the shank 210 to be allocated in the positions of the four collect chucks 140.

Figure 5:
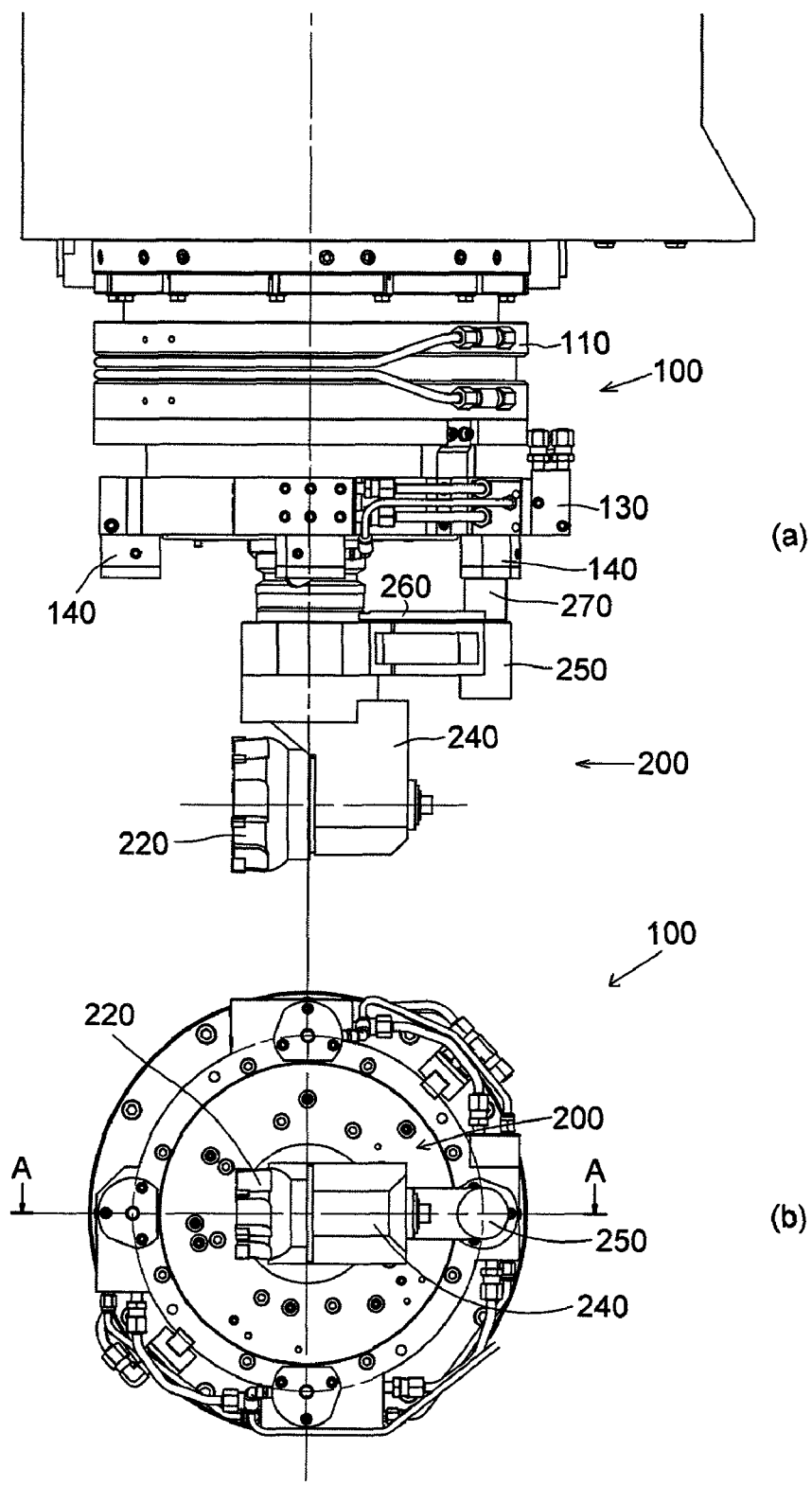
FIG. 5 is a front view and a bottom view of the attachment unit for five-face machining.

FIG. 5(a) is a front view of the attachment unit 100 for five-face machining and FIG. 5(b) is a bottom view thereof, showing a state where the clamp unit 130 of the attachment unit 100 for five-face machining is lowered so that one of the four collet chucks 140 clamps the pull stud bolt 270 on the arm 250 of the angle tool holder 200.

In this state, the angle cutter 220 is capable of machining.

Figure 6:
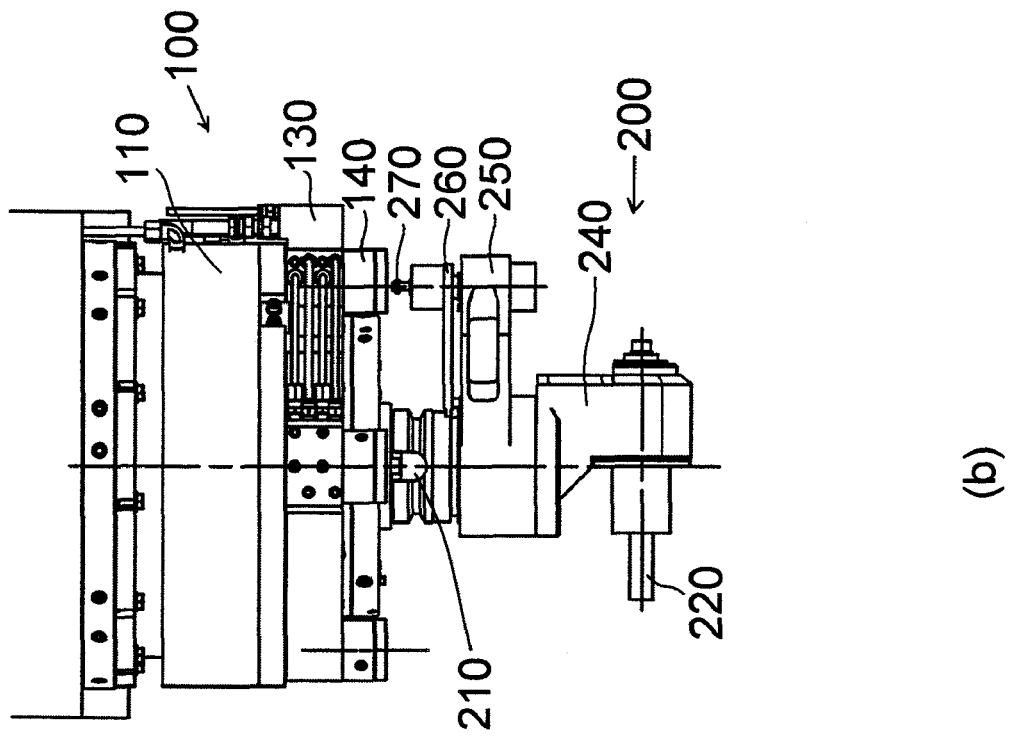
FIG. 6 is an explanatory view showing a clamping operation of an angle tool holder.
Figure 6:
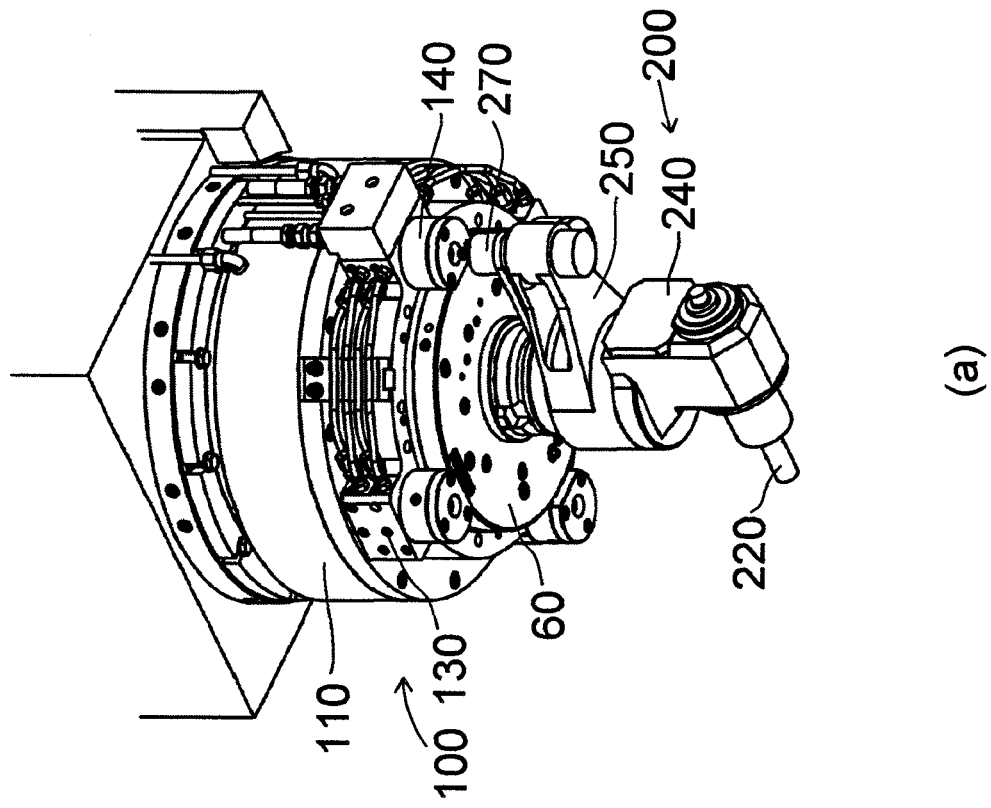

FIGS. 6(a) and 6(b) illustrate a state in which the angle tool holder 200 is allocated to one of the four collet chucks 140 on the attachment unit 100 for five-face machining. In this state, the clamp unit 130 on the attachment unit 100 for five-face machining is at a drawn up position.

Figure 7:
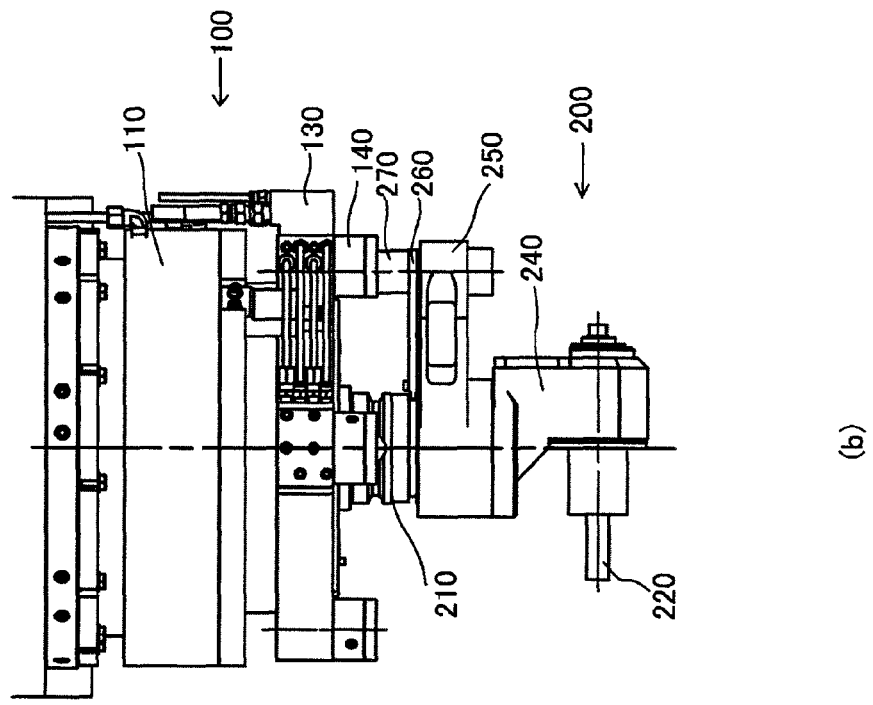
FIG. 7 is an explanatory view showing the clamping operation of the angle tool holder.
Figure 7:
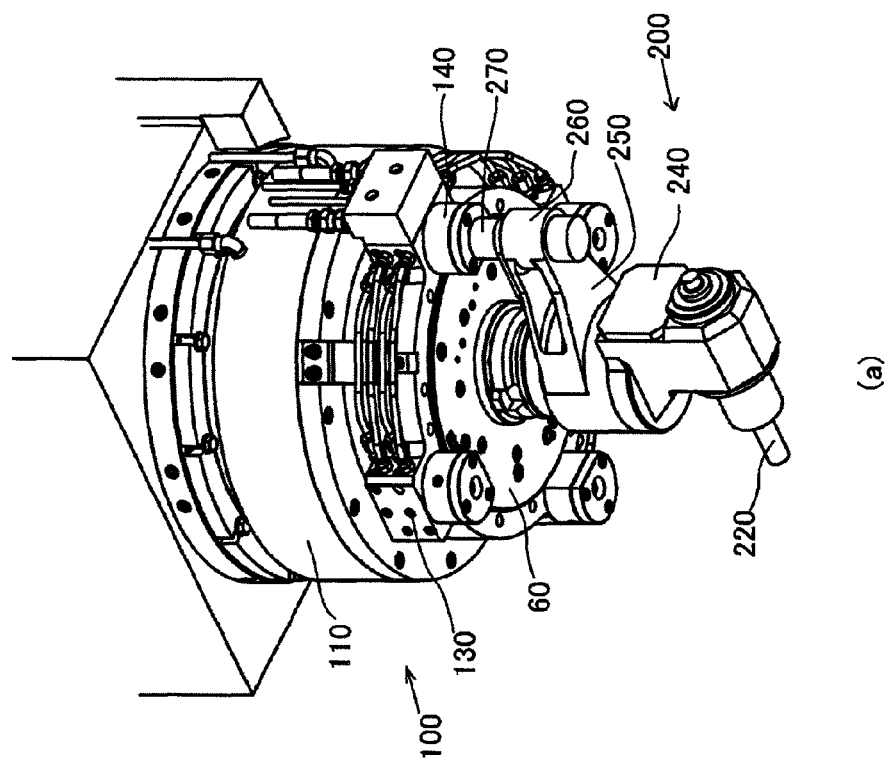

FIGS. 7(a) and 7(b) illustrate a state in which the clamp unit 130 of the attachment unit 100 for five-face machining is lowered with respect to the angle tool holder 200 having been allocated, so as to clamp the pull stud bolt 270 via the collet chuck 140.

FIGS. 8 through 11 are cross-sectional views taken at A-A of FIG. 5(b), illustrating the details and operations of the structure of the attachment unit 100 for five-face machining according to the present invention.

The attachment unit 100 for five-face machining comprises a ring-shaped cylinder member 110, and the ring-shaped cylinder member 110 is secured via bolts 112 to the spindle head. A hydraulic chamber 114 is disposed within the ring-shaped cylinder member 110, and a ring-shaped piston 120 is fit within the chamber in a slidable manner. Hydraulic ports 116a and 116b for moving the piston 120 is communicated with the hydraulic chamber 114.

The lower end of the piston 120 is connected to a ring-shaped clamp unit 130. Collet chucks 140 are disposed at four locations on the outer circumference portion of the clamp unit 130.

Each collet chuck 140 has a hydraulic chamber 152 disposed within a main body 150, and a piston 142 capable of moving in sliding motion is inserted to the hydraulic chamber 152.

The piston 142 opens and closes claws 144. Ports 154a and 154b are formed to communicate with the hydraulic chamber 152.

The angle tool holder 200 has a shank 210, which is inserted to and held in a shank hole formed on the spindle side. A notch is formed to the outer circumference portion of a shaft 212 formed integrally with the shank 210, and a shaft-side end portion 262 of a lever 260 is engaged thereto. An arm 250 is connected to the housing 240, and the pull stud bolt 270 is mounted on the arm 250 and passed through the lever 260 to face the collet chuck 140.

Figure 8:
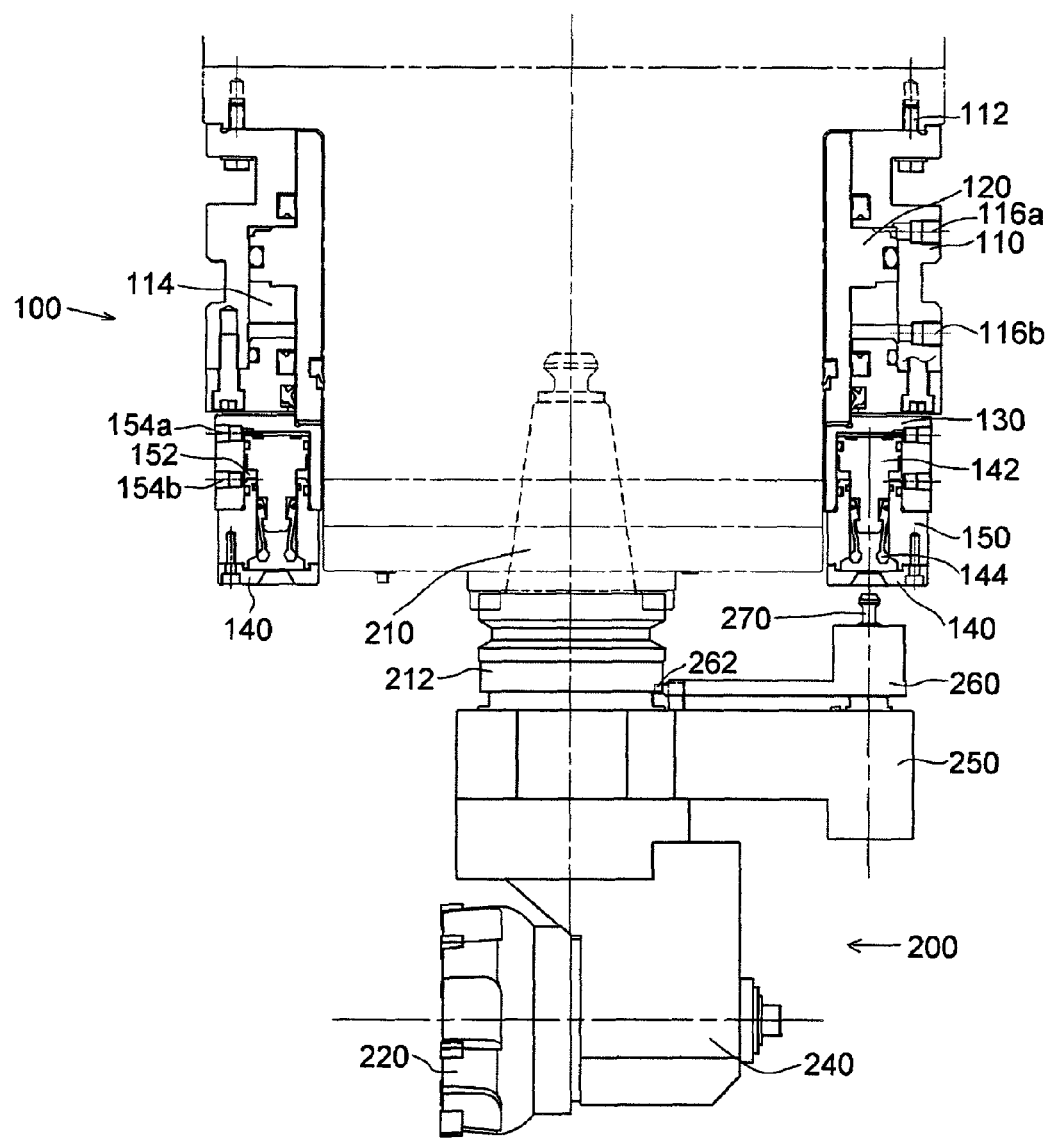
FIG. 8 is a cross-sectional view of the attachment unit for five-face machining.

FIG. 8 shows an operation to allocate the angle tool holder 200 exchanged on the spindle to one of the four collet chucks 140. When the shaft 212 formed integrally with the shank 210 rotates at a low speed for allocation, the lever 260 attached to the shaft 212 revolves the housing 240 formed integrally with the arm 250, and allocates the pull stud bolt 270 to the position of the predetermined collet chuck 140.

During this operation, the piston 142 is biased toward the upper direction, and the claws 144 are closed.

Figure 9:
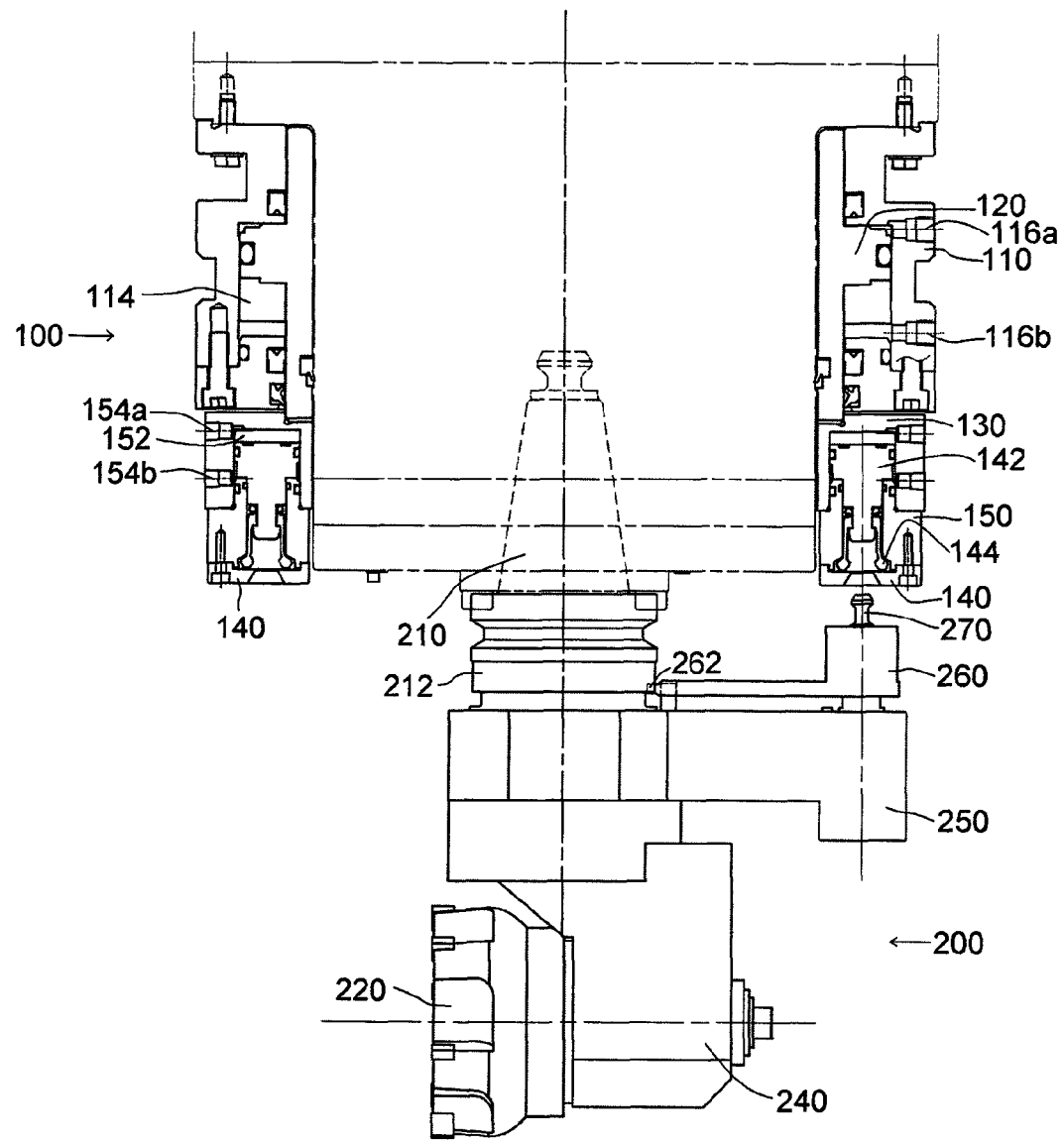
FIG. 9 is a cross-sectional view of the attachment unit for five-face machining.

FIG. 9 shows a state in which the allocation of the angle tool holder 200 has been completed.

The piston 142 of the collet chuck 140 facing the pull stud bolt 270 is biased downward via hydraulic pressure, by which the claws 144 are opened.

Figure 10:
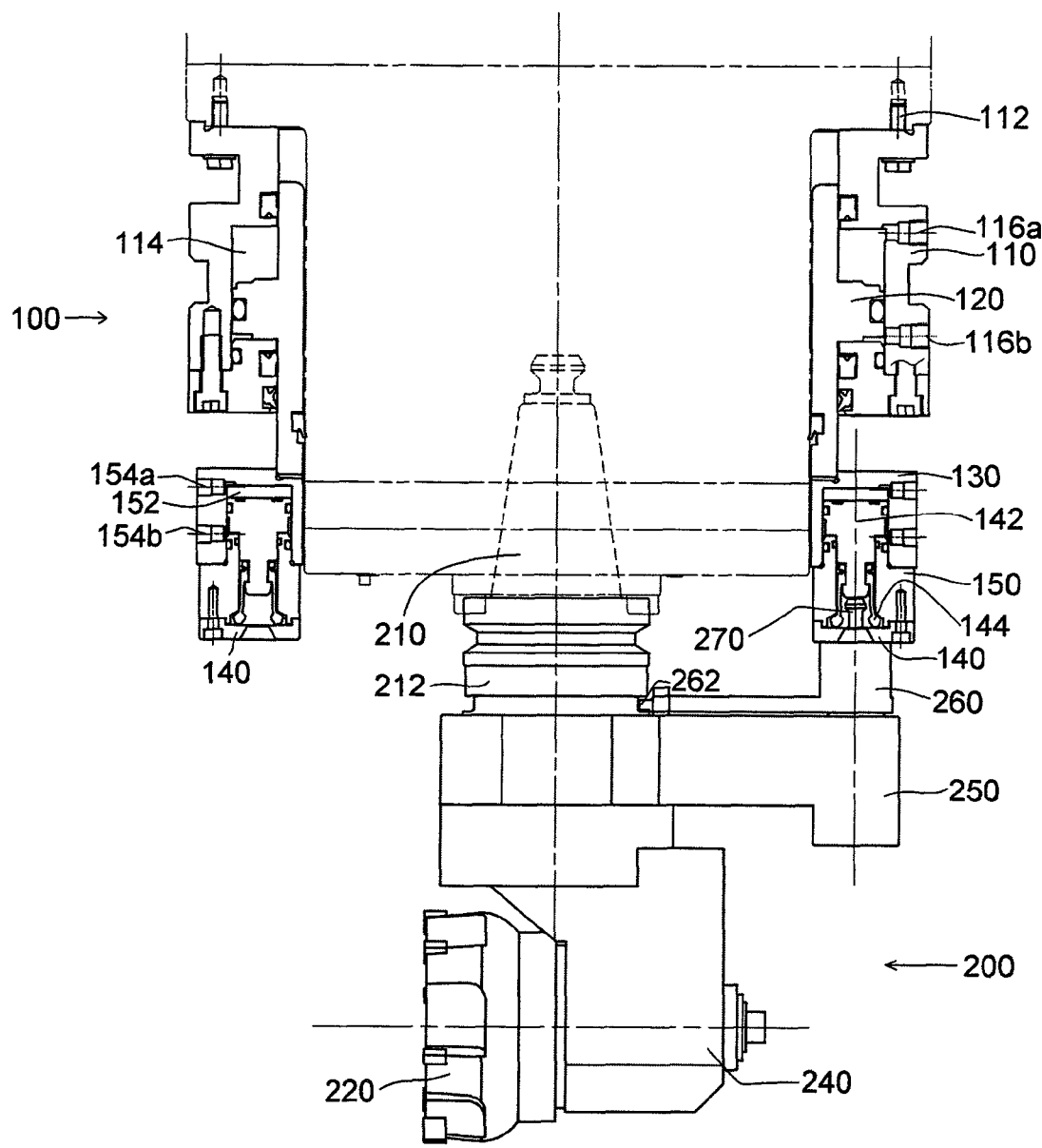
FIG. 10 is a cross-sectional view of the attachment unit for five-face machining.

FIG. 10 shows a state in which hydraulic oil is supplied to the hydraulic chamber 114 of the ring-shaped cylinder member 110 from the port 116a to drive the piston 120 downward so as to lower the clamp unit 130.

The collet chuck 140 receives the pull stud bolt 270 on the arm 250.

The end 262 of the lever 260 is disengaged from the notch on the shaft 212.

Figure 11:
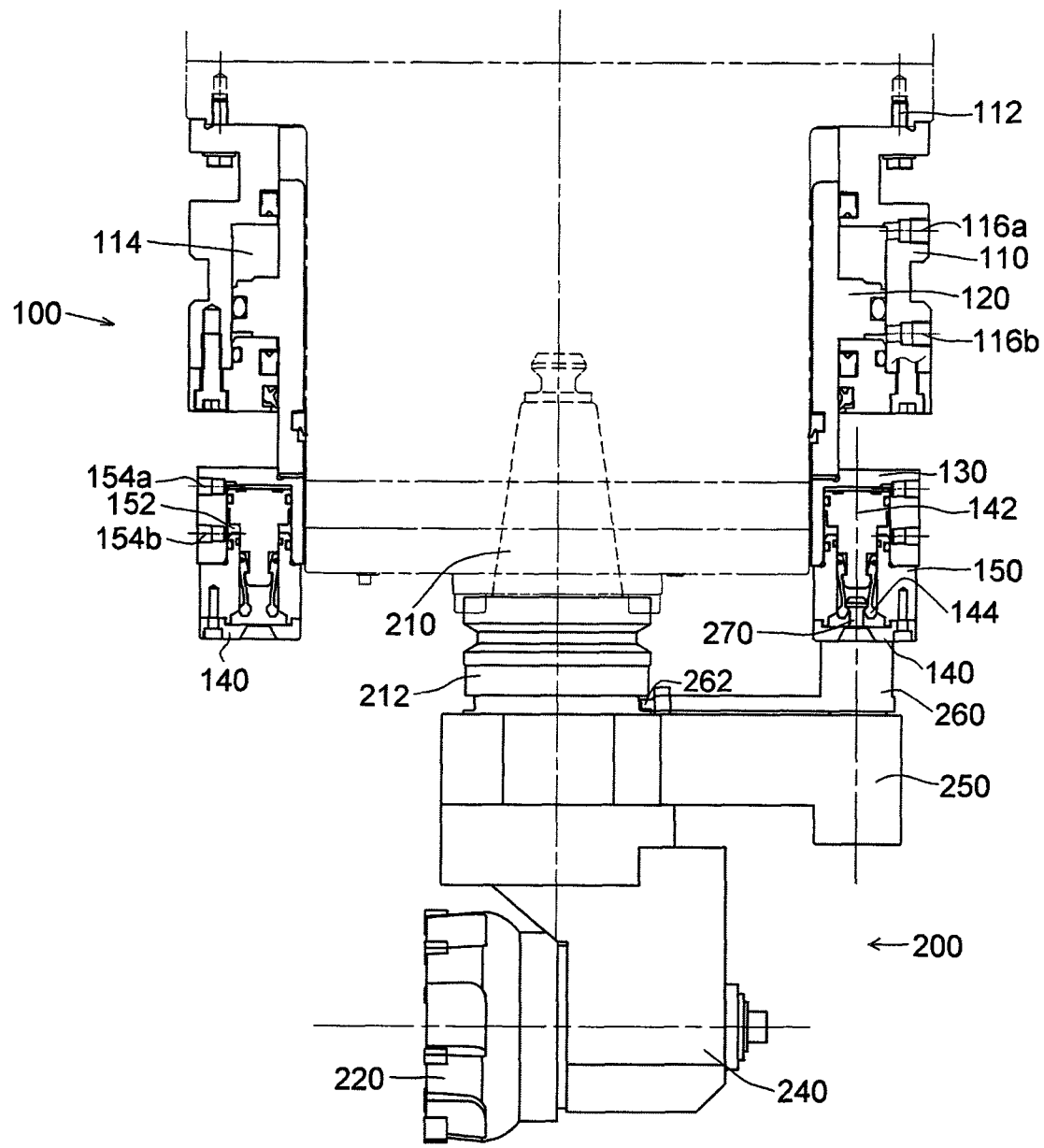
FIG. 11 is a cross-sectional view of the attachment unit for five-face machining.

FIG. 11 shows a state in which hydraulic oil is supplied to the hydraulic chamber 152 of the main body 150 of the clamp unit 130 from the port 154b to move the piston 142 upward, so as to clamp the pull stud bolt 270 via the claws 144.

In this state, the arm 250 on the angle tool holder 200 is gripped securely via the clamp unit 130 of the attachment unit 100 for five-face machining.

The shaft 212 formed integrally with the shank 210 drives the angle cutter 220 by the power transmitted from the spindle side to subject a workpiece to five-face machining.

The lever 260 is disconnected from the shaft 212 so as to prevent interference.

Figure 12:
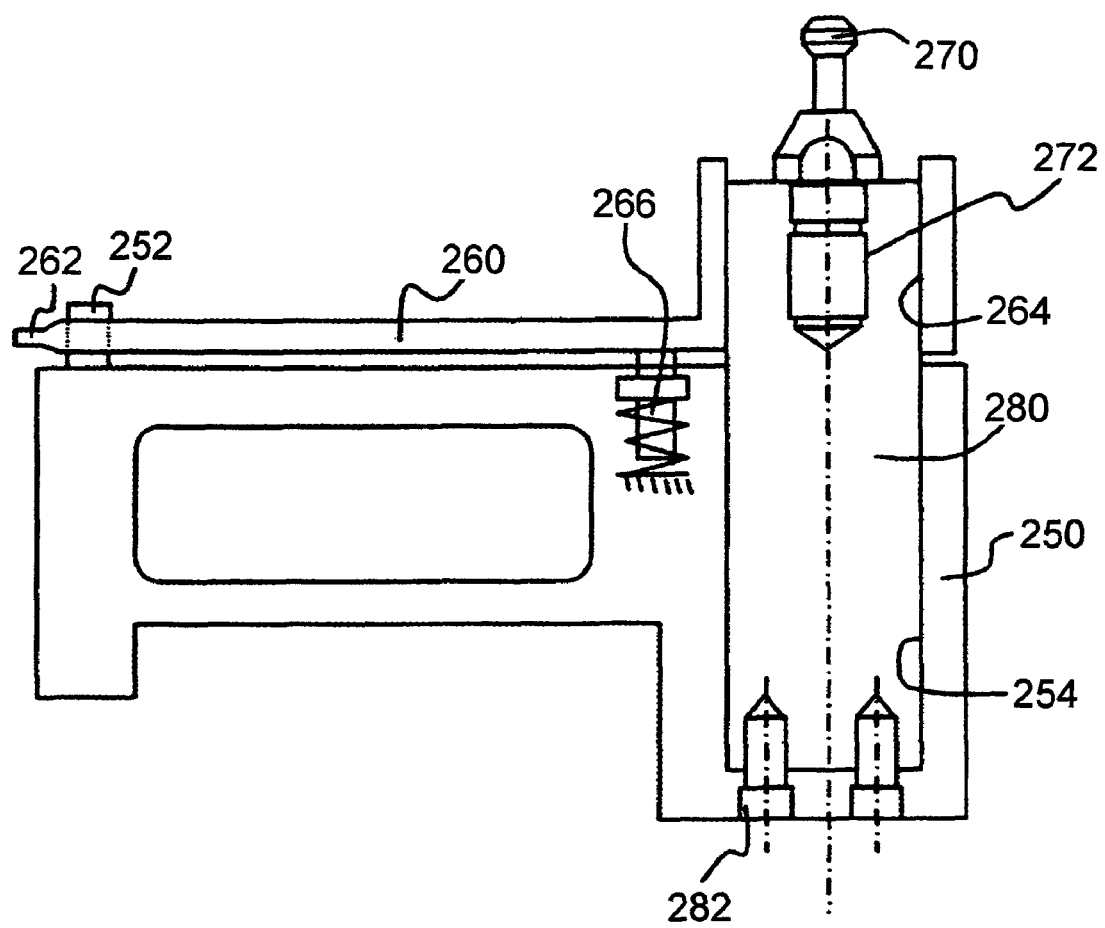
FIG. 12 is a detailed view of an arm and a lever of the angle tool holder.

FIG. 12 is a cross-sectional view showing the arrangement of the arm 250 and the lever 260.

A shaft 280 is inserted to a hole 254 formed on the arm 250 with a bottom and fixed thereto via bolts 282. The pull stud bolt 270 is erected on the upper end of the shaft 280 via a screw portion 272.

The lever 260 has a bore portion 264 fit to the outer circumference of the shaft 280, by which the lever is slidably supported on the shaft 280. A hole is formed near a shaft-side end portion 262 of the lever 260, which is inserted to a projection 252 projected on the arm 250.

The lever 260 is biased toward the direction to separate from the arm 250 via a spring 266, and the end portion 262 of the lever 260 is engaged with the notch formed on the shaft 212 for allocation.

As described, the attachment unit for five-face machining according to the present invention can be additionally attached to a vertical machining center in the manner described above, by which the machining ability can be enhanced easily.

Further, the three collet chucks out of the four collet chucks, which are uninvolved with gripping the angle tool, maintain their claws in a closed state.

Since the attachment unit 100 for five-face machining is disposed on the spindle, the unit is exposed to a severe environment during machining in which cutting fluids are sprayed and machining swarfs fly thereon.

Therefore, it is necessary to additionally provide a device for preventing particles from entering through the openings of the three collet chucks 140 that are not used at that time.

Figure 13:
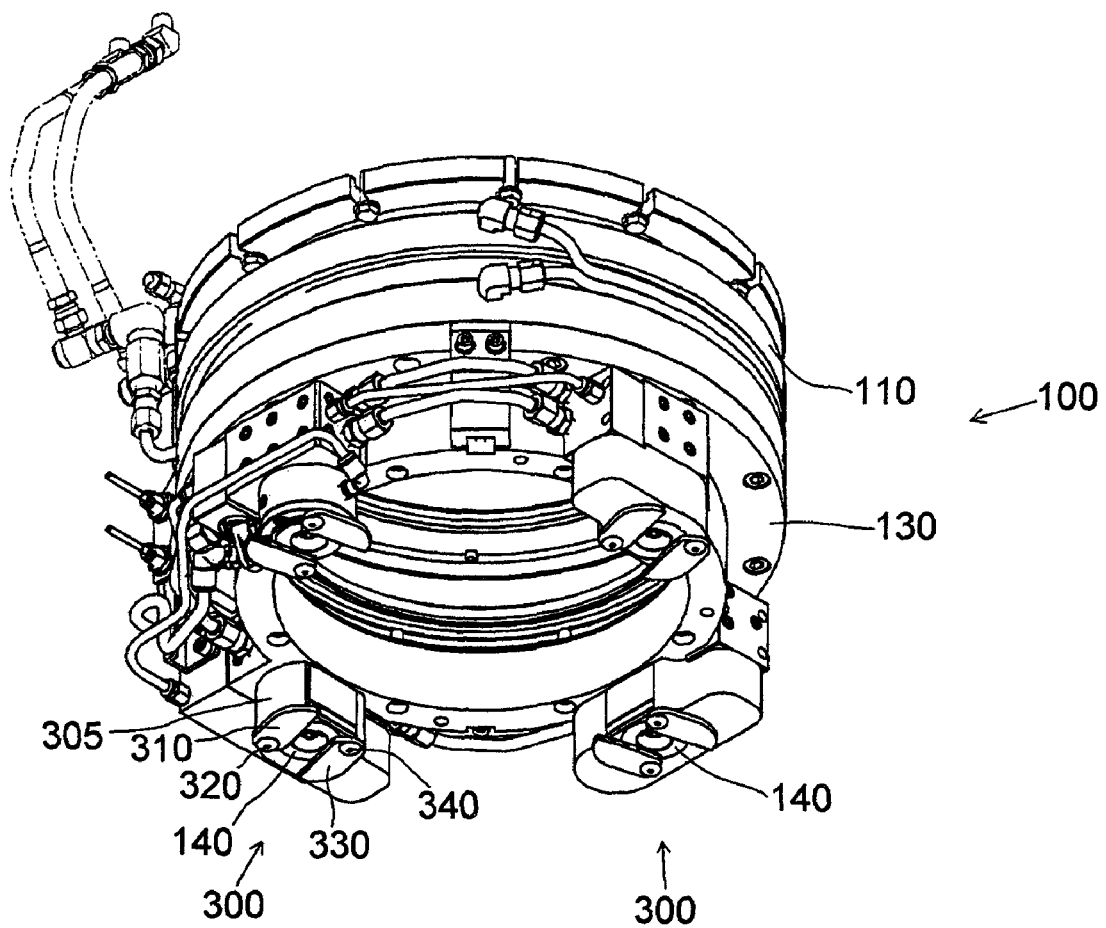
FIG. 13 is an explanatory view showing an opening and closing mechanism of a collet chuck.

FIG. 13 illustrates an embodiment for opening and closing the openings of the collet chucks 140 using a mechanical device.

Four collet chucks 140 are disposed on a lower end surface of the clamp unit 130 of the attachment unit 100 for five-face machining, and the surrounding area of each collet chuck 140 is covered by a housing 305 of a shutter device 300.

A pair of blades opposed to one another with the opening of the collet chuck 140 is disposed on the lower side of the housing 305.

A first blade 310 is supported on a first blade rotary shaft 320, wherein the driving mechanism for the first blade is disposed within the housing 305.

A second blade 330 opposed to the first blade 310 is supported on a second blade rotary shaft 340, wherein the driving mechanism for the second blade is disposed within the housing 305.

FIG. 13 shows a state in which the first blade 310 and the second blade 330 opposed thereto are opened.

From this state, the first blade 310 and the second blade 330 opposed thereto revolve around the rotary shafts 320 and 340 to a closed position where the blades contact one another to seal the opening of the collet chuck 140.

Figure 14:
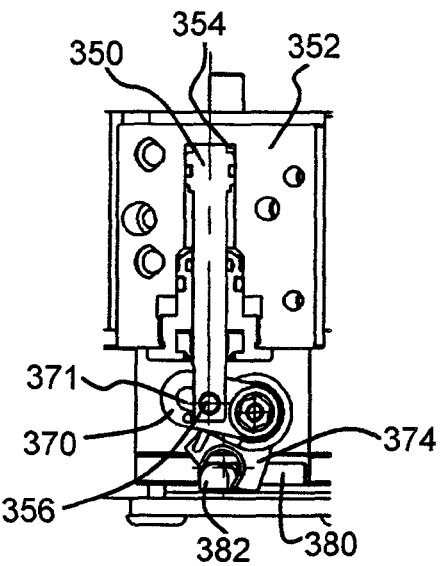
FIG. 14 is an explanatory view of a shutter device.
Figure 14:
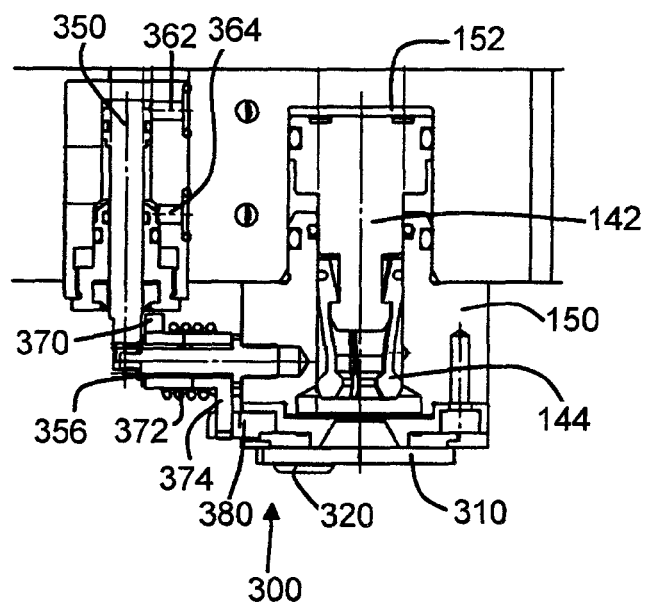
Figure 14:
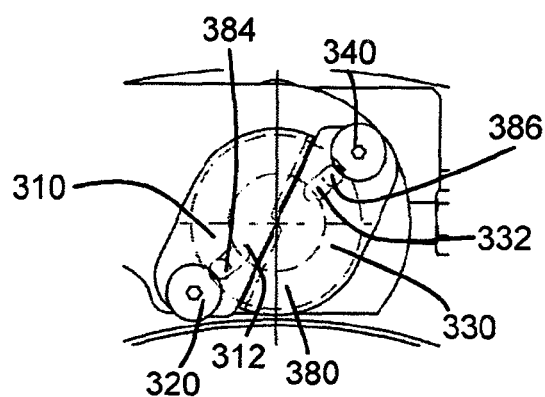
Figure 15:
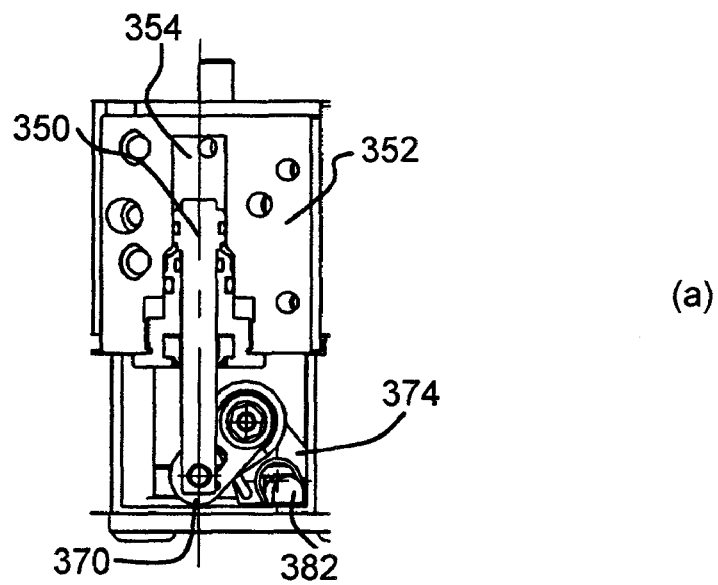
FIG. 15 is an explanatory view of the shutter device.
Figure 15:
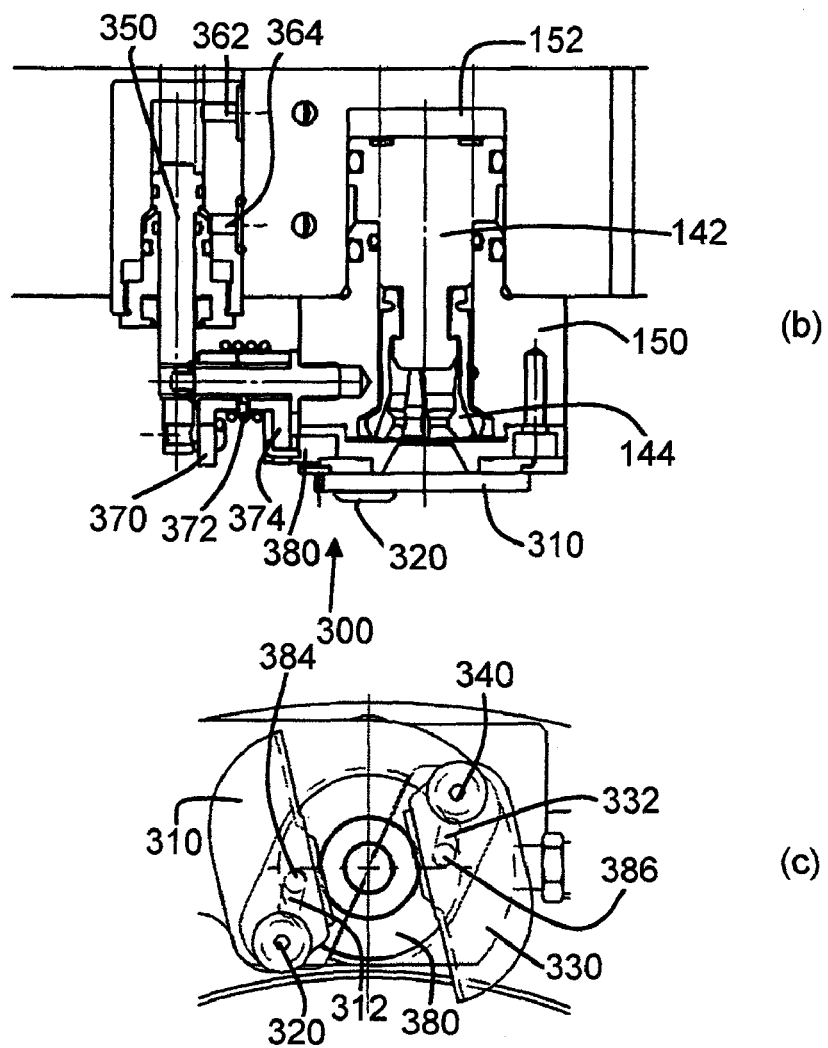

FIGS. 14 and 15 are explanatory views illustrating the details of the shutter device 300.

The shutter device 300 has a hydraulic chamber 354 formed within a housing 352 into which a piston 350 is inserted. The hydraulic chamber 354 has ports 362 and 364 arranged so that the piston 350 is placed therebetween. Hydraulic oil to be supplied to the hydraulic chamber 152 of the piston 142 for operating the collet chucks is supplied simultaneously into the ports 362 and 364.

A roller 356 is attached to a lower end portion of the piston 350, wherein the roller 356 is engaged with a long hole 371 formed on a first link 370 to rotate the first link 370. The first link 370 rotates a second link 374 via a coil spring 372.

The second link 374 is engaged with a pin 382 disposed on an outer circumference of a ring member 380 to rotate the ring member 380. The ring member 380 has a pair of projections 384 and 386 projected toward the axial direction, and the respective projections 384 and 386 are engaged with long holes 312 and 332 disposed on the first blade 310 and the second blade 330.

Based on the above arrangement, when the ring member 380 rotates via the vertical movement of the piston 350, the pair of blades 310 and 330 revolve around the rotary shafts 320 and 340.

FIG. 14 shows a state in which the piston 350 is placed at the upper area of the hydraulic chamber 354 and the blades 310 and 330 of the shutter device 300 is closed.

FIG. 15 shows a state in which the piston 350 is lowered so as to rotate the ring member 380 and open the blades 310 and 330. The blades 310 and 330 are biased via return springs or the like toward the closing direction, and are biased toward the opening direction when the piston 350 is operated.

As described, the shutter device 300 of the present invention enables to open and close the blades in synchronism with the piston for operating the collet chucks for gripping the arm of an angle tool holder, so as to close the openings of the collet chucks not gripping the arm of the angle tool holder and to prevent the entry of particles.

Furthermore, since air is introduced to the interior of the shutter device 300 to maintain the inner pressure higher than the external pressure thereof, the entry of particles can be prevented with higher reliability.

REFERENCE NUMBERS 50 spindle head
60 spindle housing
70 spindle
100 attachment unit for five-face machining
110 ring-shaped cylinder member
114 hydraulic chamber
116a, 116b port
120 ring-shaped piston
130 clamp unit
140 collet chuck
142 piston
144 claw
150 main body
152 hydraulic chamber
154a, 154b port
200 angle tool holder
210 shank
212 shaft
220 angle cutter
240 housing
250 arm
260 lever
270 pull stud bolt
300 shutter device
305 housing
310 first blade
320 first blade rotary shaft
330 second blade
340 second blade rotary shaft
350 piston
380 ring member

The invention claimed is:

1. An attachment unit for five-face machining attached to a spindle head of a vertical machining center, comprising:
   a ring-shaped cylinder member fit to an outer circumference portion of a spindle housing projected from a lower end portion of a spindle head for supporting a spindle and secured to the spindle head;
   a clamp unit directly connected to a ring-shaped piston disposed within the ring-shaped cylinder member and moved up and down; and
   four collet chucks disposed at regular intervals along a circumference on a lower side of the clamp unit;
   wherein the four collet chucks respectively grip a pull stud bolt disposed on an arm of an allocated angle tool holder attached to the spindle.

2. The attachment unit for five-face machining according to claim 1, wherein
   the four collet chucks have claws that open and close via hydraulic pistons, wherein the claws are closed when the clamp unit is at an elevated position, and the claws are closed again after the clamp unit is lowered to grip the pull stud bolt on the arm of the angle tool holder.

3. The attachment unit for five-face machining according to claim 1, wherein the four collet chucks are respectively equipped with a shutter device for opening and closing an opening thereof; and the shutter device comprises a pair of blades that oppose to one another with the opening placed therebetween, and a means for revolving the respective blades.

4. The attachment unit for five-face machining according to claim 3, wherein the shutter device comprises a hydraulic piston operated in an interlocked manner with a hydraulic piston for operating the collet chuck, a link mechanism for converting a linear movement of the hydraulic piston for driving the shutter into revolving movement and operating a ring member, and a means operated in an interlocked manner with the revolving movement of the ring member for revolving the blades.

* * * * *